United States Patent
Finney et al.

(10) Patent No.: US 11,453,282 B2
(45) Date of Patent: Sep. 27, 2022

(54) VEHICLE REAR WINDOW COVER

(71) Applicant: Delk, Inc.

(72) Inventors: James Matthew Finney, Nolensville, TN (US); Eugenio Jose Duarte, Mount Juliet, TN (US); Raymond Don Barnes, Jr., Nashville, TN (US)

(73) Assignee: Delk Industries, Inc., Nashville, TN (US)

( * ) Notice: Subject to any disclaimer, the term of this patent is extended or adjusted under 35 U.S.C. 154(b) by 400 days.

(21) Appl. No.: 16/709,173

(22) Filed: Dec. 10, 2019

(65) Prior Publication Data

US 2020/0108705 A1 Apr. 9, 2020

Related U.S. Application Data

(63) Continuation-in-part of application No. 15/955,526, filed on Apr. 17, 2018, now Pat. No. 10,919,374, which is a continuation-in-part of application No. 15/833,823, filed on Dec. 6, 2017, now Pat. No. 10,266,044, which is a continuation-in-part of application No. 15/594,403, filed on May 12, 2017, now Pat. No. 9,862,259, which is a continuation-in-part of application No. 14/185,125, filed on Feb. 20, 2014, now abandoned.

(51) Int. Cl.
*B60J 11/08* (2006.01)

(52) U.S. Cl.
CPC ..................... *B60J 11/08* (2013.01)

(58) Field of Classification Search
CPC ........................................................ B60J 11/08
USPC ...................................................... 150/166, 168
See application file for complete search history.

(56) References Cited

U.S. PATENT DOCUMENTS

| | | | | |
|---|---|---|---|---|
| 5,292,167 A * | 3/1994 | Hellman | ................. | B60J 11/08 160/370.21 |
| 5,816,641 A * | 10/1998 | Chen | ................. | B60J 11/08 150/168 |
| 7,673,924 B1 * | 3/2010 | Lau | ................. | B60J 11/08 296/95.1 |
| 10,266,044 B2 * | 4/2019 | Barnes, Jr. | ................. | B60J 11/08 |
| 2004/0202373 A1 * | 10/2004 | Lee | ................. | G06T 7/223 375/E7.101 |
| 2009/0261614 A1 * | 10/2009 | Haas | ................. | B60J 11/08 296/95.1 |
| 2011/0109116 A1 * | 5/2011 | Mitchell | ................. | B60J 11/08 296/95.1 |
| 2015/0013861 A1 * | 1/2015 | Ein | ................. | B60J 11/08 150/168 |

* cited by examiner

*Primary Examiner* — Sue A Weaver
(74) *Attorney, Agent, or Firm* — Kevin E. Schraven; Anooj Patel; Hankin Patent Law, APC

(57) ABSTRACT

A vehicle rear window cover comprising: a cover portion; a first strap assembly, which comprises one or more strap loops; a second strap assembly, which comprises one or more strap loop; two hooks that are configured to engage with said strap assemblies and a vehicle, such that the cover portion substantially covers the rear window of a vehicle. Because the hooks may be moved from loop to loop, the cover is adjustable. The cover may also comprise support members that prevent bulging, flapping, or puckering of the cover portion.

20 Claims, 8 Drawing Sheets

VEHICLE REAR WINDOW COVER

CROSS-REFERENCE TO RELATED APPLICATIONS

This application is a continuation-in-part of U.S. patent application Ser. No. 15/955,526, filed on Apr. 17, 2018, now U.S. Pat. No. 10,919,374, titled "VEHICLE WINDSHIELD PROTECTION DEVICE", the contents of which are expressly incorporated herein by this reference, and to which priority is claimed. U.S. patent application Ser. No. 15/955,526 is a continuation-in-part of U.S. patent application Ser. No. 15/833,823, now U.S. Pat. No. 10,266,044, titled "VEHICLE WINDSHIELD PROTECTION DEVICE", the contents of which are expressly incorporated herein by this reference, and to which priority is claimed. U.S. patent application Ser. No. 15/833,823 is a continuation-in-part of U.S. patent application Ser. No. 15/594,403, now U.S. Pat. No. 9,862,259, titled "VEHICLE WINDSHIELD PROTECTION DEVICE", the contents of which are expressly incorporated herein by this reference, and to which priority is claimed. U.S. patent application Ser. No. 15/594,403 is a continuation-in-part of U.S. patent application Ser. No. 14/185,125, filed on Feb. 20, 2014, titled "VEHICLE WINDSHIELD PROTECTION DEVICE", the contents of which are expressly incorporated herein by this reference, and to which priority is claimed.

FIELD OF THE INVENTION

The present disclosure generally relates to devices for covering a vehicle window in order to protect the vehicle window from the elements. More particularly, the present disclosure generally relates to a vehicle rear window cover that prevents sun, UV rays, ice, snow, and frost from covering or entering the vehicle's rear window when the vehicle is not in use.

BACKGROUND OF THE INVENTION

Prior to the cover of the present disclosure, some commercially available products have been available for either (1) preventing sun or UV rays from entering through the rear window of a parked car, or (2) preventing ice, snow, and frost build-up on the rear window of a parked car. However, these products are deficient because: (1) they generally fail to securely stay in place during strong wind gusts; (2) they generally fail to cover the entire rear window; (3) they are usually made from inferior materials; and/or (4) they are difficult to place on the rear window. Specifically, there is no way to secure the bottom half of the cover to the vehicle. The prior covers can fold over on themselves and flap in the wind, which will destroy the covers and allow winter elements to accumulate on the rear window. There is also no ability to adjust for different size vehicles.

Thus, what is needed is an improved rear window cover that fully and firmly covers the entire rear window of a vehicle to protect it from the elements, is adjustable, is easy to install, and is easy to remove.

SUMMARY OF THE INVENTION

To minimize the limitations in the prior art, and to minimize other limitations that will become apparent upon reading and understanding the present specification, the present disclosure discloses a new and useful vehicle rear window protection device.

The vehicle rear window protection device or cover may cover the outside of an entire rear window of most vehicles, including trucks and SUVs. The device may be made from materials that safely and effectively protect the vehicle rear window and/or reflect sunlight away from the vehicle. The device may be attached to the vehicle such that it may be firmly attached to a vehicle under strong winds, yet easily removed by the user. The cover may be made from a durable polyester with a water-resistant polyvinyl chloride substrate. As such, moisture is preferably unable to penetrate the cover, which may prevent the cover from freezing (sticking) to the window.

In one embodiment, the cover may have adjustable elastic side straps with rubber hooks that connect to the vehicle's rear wheels or rear door handles. The rubber hooks may be mounted to different loops on the elastic straps to accommodate different size vehicles. The rubber hooks allow for a secure, yet easy, installation and removal of the cover without damaging or scratching the vehicle. Optionally, rigid supports on each side of the cover aid in wind abatement and help prevent puckering of the cover portion.

In one embodiment the cover portion may be a durable polyester with a water-resistant polyvinyl chloride (PVC) substrate. The shape of the cover portion may be configured to fully cover the rear window of most passenger vehicles, but not overhang on the vehicle's finish. The optional rigid supports may be cylindrical PVC dowels or may be flat polyethylene (PE) planks. The rigid supports may span from top to bottom of the cover on both the left and right edges of the cover portion.

In one embodiment, the adjustable elastic straps are sewn, glued, or clipped together in a unique manner to attach at the top, bottom, and middle sections on each side of the cover portion. Loops may preferably be sewn into the elastic straps that allow the removeable rubber hooks to be placed at different lengths of strap creating an adjustability that allows the cover to fit differently sized vehicles. The unique location of where the elastic straps are attached to the cover portion aids in preventing puckering of the cover and wind abatement.

The rigid supports, in cooperation with the elastic side straps, may prevent the cover from puckering and/or folding over on itself. This allows for maximum coverage of the rear window and prevents accumulation of winter elements, such as snow, ice, sleet, and frost. The rubber hooks may attach to the elastic straps (at the loops), and then attach to either the rear wheels or the rear door handles of the vehicle. The hooks, which are preferably rubber or some other non-scratching material, such as soft plastic (or plastic or rubber coated metal), may be configured to allow users to easily place the hook in the correct loop of the elastic strap, and to easily attach it to the vehicle. The hook may comprise an open slot to allow the hook to be removed and placed in the appropriate loop on the elastic strap. Preferably, the rigid supports, elastic straps, and rubber hooks are configured to secure the cover to the rear window in windy conditions, allow for adjustability, and easy installation.

In some embodiments, the rigid supports may be aluminum poles. In one embodiment, the removable slotted hooks and loops may be replaced by a series of hooks that are placed along the length of the elastic straps.

One embodiment may be an a vehicle rear window cover comprising: a cover portion; a first strap assembly, comprising: a first top strap, a first bottom strap, and a first strap loop portion; a second strap assembly, comprising: a first top strap, a first bottom strap, and a first strap loop portion; a first hook; and a second hook. The first top strap, the first bottom strap and the first strap loop portion are connected at a first strap joint. The second top strap, the second bottom strap and the second strap loop portion are connected at a second strap joint. The cover portion, when engaged with a vehicle, substantially covers an outer surface of a rear wind of the vehicle. The cover portion may comprise a top edge, a bottom edge, a first side edge, and a second side edge such that there is a first top corner, a second top corner, a first bottom corner, and a second bottom corner. The first top strap may extend between the first top corner and the first strap joint and the first bottom strap may extend between the first bottom corner and the first strap joint. The second top strap may extend between the second top corner and the second strap joint. The second bottom strap may extend between the second bottom corner and the second strap joint. The first strap loop portion may extend distally away from the first strap joint and may comprise one or more first strap loops. The second strap loop portion may extend distally away from the second strap joint and comprises one or more second strap loops. The first hook may be configured to removeably engage with the one or more first strap loops and the second hook may be configured to removeably engage with the one or more second strap loops, such that the vehicle rear window cover is adjustable. The first hook and the second hook are configured to removeably engage with the vehicle, such that the cover portion is configured to be securely attached to the vehicle. In another embodiment, the vehicle rear window cover may further comprise two support members, wherein the two support members may be located at approximately the first side edge and at approximately the second side edge and they substantially prevent the vehicle rear window cover from puckering when the vehicle rear window cover is on the vehicle. The strap assemblies may further comprise a first mid-strap and a second mid-strap, wherein the first mid-strap extends from a first side of the cover portion to the first strap joint and wherein the second mid-strap extends from a second side of the cover portion to the second strap joint. In some embodiments, the cover portion may also substantially cover one or more rear window wipers. The cover portion may comprise an interior Polyvinyl Chloride coating, wherein the Polyvinyl Chloride coating makes the cover portion remain flexible in temperatures below 0° C. The cover portion substantially prevents frost, ice, and snow from adhering to the rear window. In one embodiment the top edge may have a concave curve to avoid any rear window spoilers. Each of the first and second hooks may comprise a hook end and a strap opening, which comprises a slot that is configured to allow the first and second hooks to removeably engage with the one or more first strap loops and the one or more second strap loops. The first and second hooks may be configured to removeably engage with a door handle of the vehicle and/or with a wheel of the vehicle.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE DRAWINGS

Figure 1:
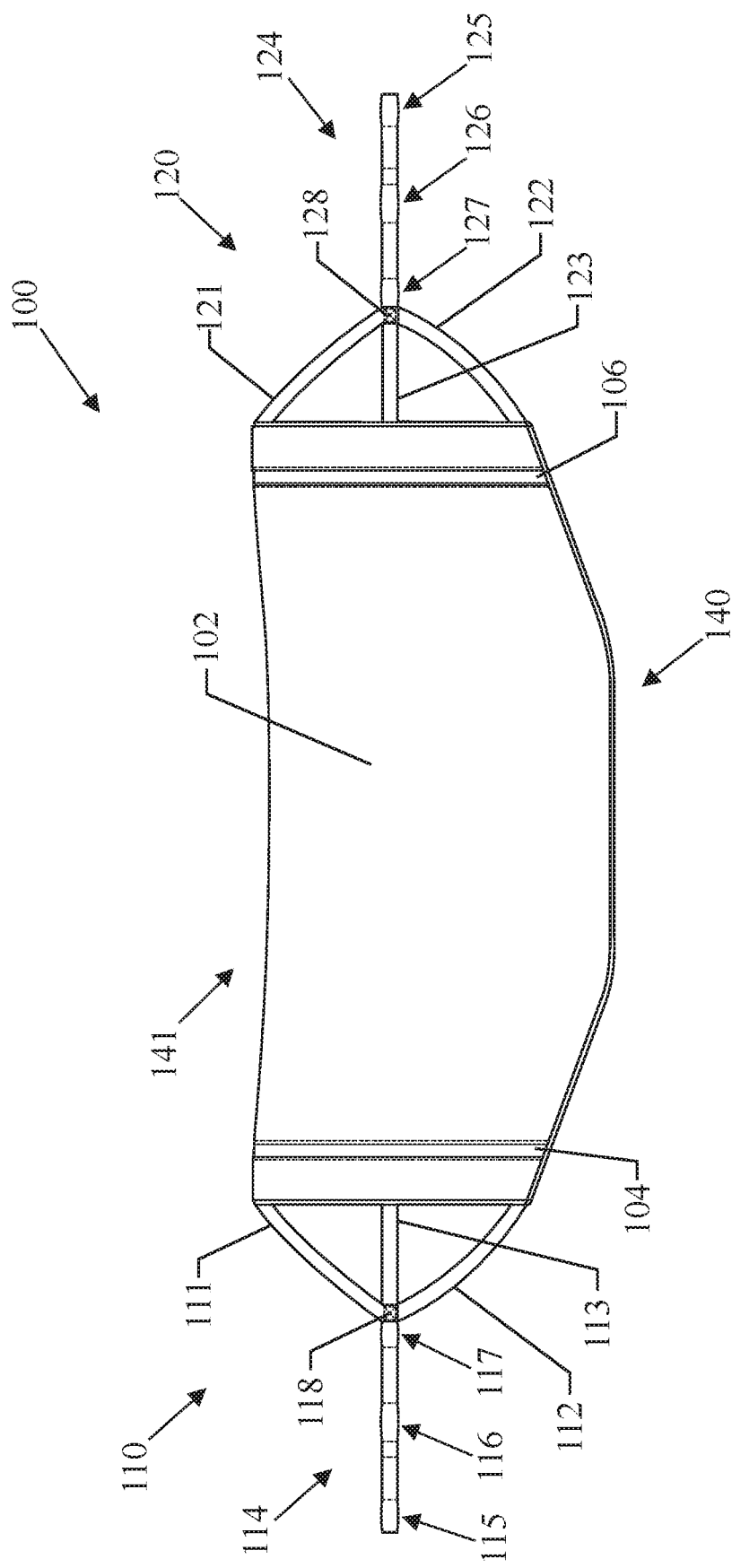
FIG. 1 is an illustration of a front view of one embodiment of the vehicle rear window cover.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the figures, and the detailed descriptions thereof, are to be regarded as illustrative in nature and not restrictive. Also, the reference or non-reference to a particular embodiment of the invention shall not be interpreted to limit the scope of the invention.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

FIG. 1 is an illustration of a front view of one embodiment of the vehicle rear window cover. As shown in FIG. 1, the vehicle rear window cover 100 may comprise a cover portion 102, rigid supports 104, 106, first strap assembly 110, and second strap assembly 120. The cover portion 102 may be configured to substantially cover an outer surface of a rear window of a vehicle. The cover portion 102, which is shown as a single piece in FIG. 1, may be more than one piece. The purpose of the cover portion 102 is to substantially prevent frost, ice, and snow from adhering to the rear window. The cover portion 102 is most effective at preventing ice or frost build up when it maintains direct contact with the glass of the rear window. In order to do this, the cover portion 102 may be preferably held firmly in place by the two strap assemblies, first strap assembly 110 and second strap assembly 120.

The straps of the strap assemblies 110, 120 are preferably made from high-grade elastic that allows them to returnably stretch and be hooked to the wheels, door handles, or other parts of a vehicle, while holding the cover portion 102 taut. In a preferred embodiment, the elastic straps may withstand low and high temperatures and repeated donning and removal. In one embodiment the straps may be made from polypropylene yarn.

As shown in FIG. 1, the rigid supports 104, 106, which may be a rigid rod or other dowel type structure, may provide side support to the cover portion 102. The support members 104, 106, may preferably be made from any synthetic or semi-synthetic material, such as plastic or composite. They may also be wood, treated wood, or metal, such as aluminum. The rigid supports 104, 106 may preferably extend along both sides of the cover portion 102. In some embodiments, only one support member is present. In another embodiment, there are no supports.

The cover portion 102 may comprise a rear window wiper flap portion 149, which may substantially prevent frost, ice, and snow from adhering to one or more rear window wipers. The cover portion 102 may also have a curved top edge 141, which may allow the cover portion to avoid a top rear spoiler that is sometimes above the rear window of a sport utility vehicle (SUV).

The cover portion 102 and/or the wiper flap portion 140 may comprise a Polyvinyl Chloride (PVC) coating. The PVC coating may generally help the cover portion 102 and/or wiper flap portion 140 remain flexible in temperatures below 0° C. and generally make the cover portion 102 extremely durable and water resistant. The PVC coating/substrate may sometimes only be on an interior surface of the cover portion 102, such that the PVC coating directly contacts the vehicle rear window. The cover portion 102 may be made from one or more layers of a durable, weather resistant material such as canvas, which may then be coated with the PVC coating.

As shown in FIG. 1, the first strap assembly 110 may comprise a top strap 111, bottom strap 112, mid-strap 113, strap loop portion 114, loops 115, 116, 117, and strap joint 118. As shown in FIG. 1, the top strap 111 may be connected to the top of the left end of the cover portion 102 and to the mid-strap 113 at strap joint 118. The bottom strap 112 may be connected to the bottom of the left end of the cover portion 102 and to the mid-strap 113 at strap joint 118. The mid-strap 113 may be connected to at approximately a midpoint of the left end of cover portion 102. FIG. 1 shows that the strap loop portion 114 may extend past the strap joint 118 and may comprise loops 115, 116, 117. In this manner, the first strap assembly 110 may secure the left side of the cover portion 102 to the vehicle and prevent or substantially prevent the cover portion from flapping in strong winds. The loops 115, 116, 117 may be configured to removeably engage with a connection device or connector, such as a hook.

FIG. 1 shows that the second strap assembly 120 may be substantially the same as the first strap assembly but connected to the right end of cover portion 102. The second strap assembly may comprise a top strap 121, bottom strap 122, and mid-strap 123, strap loop portion 124, loops 125, 126, 127, and strap joint 128. As shown in FIG. 1, the top strap 121 may be connected to the top of the left end of the cover portion 102 and to the mid-strap 123 at strap joint 128. The bottom strap 122 may be connected to the bottom of the right end of the cover portion 102 and to the mid-strap 123 at strap joint 128. The mid-strap 123 may be connected to at approximately a midpoint of the right end of cover portion 102. FIG. 1 shows that the strap loop portion 124 may extend past the strap joint 128 and may comprise loops 125, 126, 127. In this manner, the second strap assembly 120 may secure the right side of the cover portion 102 to the vehicle and prevent or substantially prevent the cover portion 102 from flapping in strong winds. The straps 111, 112, 113, 121, 122, 123 may be attached, preferably permanently, to the cover portion via stitching, adhesive, ultrasonic welding, a mechanical connection mechanism, and the like.

In other embodiments, the first and second strap assemblies 110, 120 may have a similar configuration, but the way which the straps interconnect may be different, and a different number of straps may be connected, usually by sewing, heat fusing, or ultrasonic welding.

In another embodiment, the cover 100 may be configured to protect the vehicle from sun damage caused by solar rays. This embodiment may be in addition to, or instead of, protecting the rear window from snow and ice. In this embodiment, the cover portion 102 and or wiper portion 140 may have a reflective coating on an exterior instead of/or addition to the Polyvinyl Chloride (PVC) coating that is usually on the interior side of the cover 100. If the cover 100 is configured to protect the vehicle from the sun, then the cover portion 102 may be a lightweight, single layer of polyester, instead of a PVC coated canvas. The reflective coating may be silver, gold, blue, gray, or some other color that assists in reflecting light away from the vehicle rear window. The use of an exterior reflective protective cover 100 provides much better protection from heat and solar rays than nothing or an interior pop-up.

In one embodiment, the cover portion 102 may comprise a top edge, a bottom edge, a first side edge, and a second side edge such that there is a first top corner, a second top corner, a first bottom corner, and a second bottom corner. The first top strap 111 may extend between the first top corner and the first strap joint 118 and the first bottom strap 112 may extend between the first bottom corner and the first strap joint 118.

The second top strap 121 may extend between the second top corner and the second strap joint 128. The second bottom strap 122 may extend between the second bottom corner and the second strap joint 128. The first strap loop portion 114 may extend distally away from the first strap joint 118 and may comprise one or more first strap loops 115, 116, 117. The second strap loop portion 124 may extend distally away from the second strap joint 128 and comprises one or more second strap loops 125, 126, 127.

Figure 2:
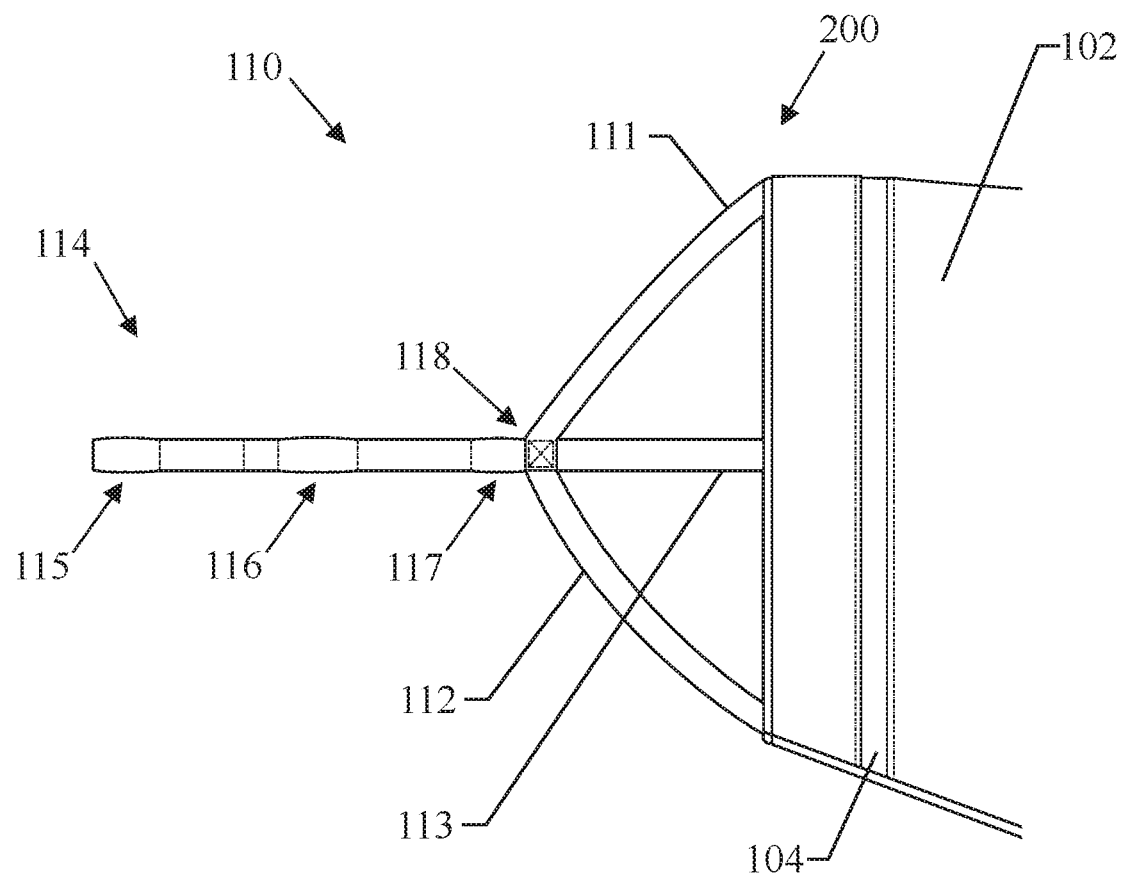
FIG. 2 is an illustration of a close-up front view of one embodiment of the vehicle rear window cover.

FIG. 2 is an illustration of a close-up front view of one embodiment of the vehicle rear window cover. As shown in FIG. 2, the vehicle rear window cover 100 may comprise cover portion 102, rigid support 104, and first strap assembly 110, which is attached to the left end 200 of the cover portion 102.

As shown in FIG. 2, the first strap assembly 110 may comprise a top strap 111, bottom strap 112, mid-strap 113, strap loop portion 114, loops 115, 116, 117, and strap joint 118. As shown in FIG. 2, the top strap 111 may be connected to the top of the left end 200 of the cover portion 102 and to the mid-strap 113 at strap joint 118. The bottom strap 112 may be connected to the bottom of the left end 200 of the cover portion 102 and to the mid-strap 113 at strap joint 118. The mid-strap 113 may be connected to at approximately a midpoint of the left end 200 of cover portion 102. FIG. 2 shows that the strap loop portion 114 extends past the strap joint 118 and may comprise loops 115, 116, 117. In this manner, the first strap assembly 110 may secure the left side of the cover portion 102 to the vehicle and prevent or substantially prevent the cover portion from flapping, puckering, or folding in strong winds. The loops 115, 116, 117 may be configured to removeably engage with a connection device or connector, such as a hook. Although FIGS. 1 and 2 show three designated loops on each strap loop portion, there may be as few as one loop and as many as several dozen.

Figure 3:
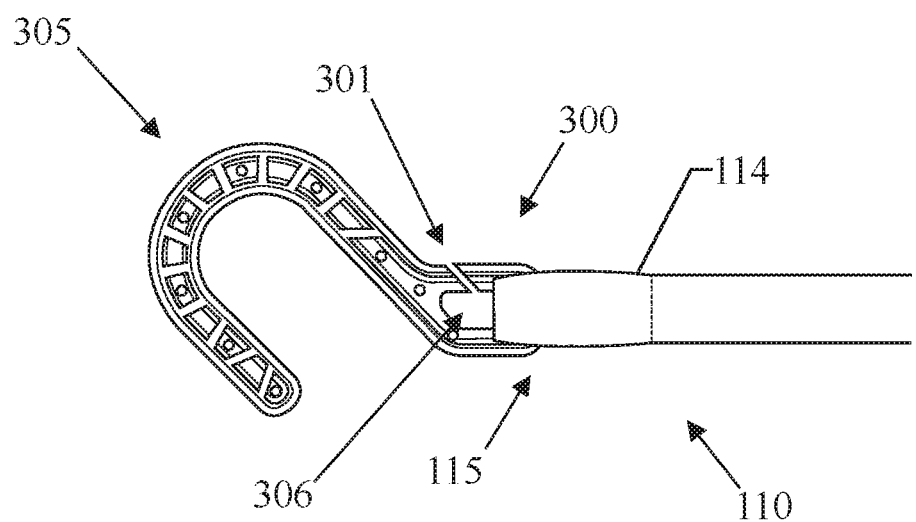
FIG. 3 is an illustration of a hook of one embodiment of the vehicle rear window cover.

FIG. 3 is an illustration of a hook of one embodiment of the vehicle rear window cover. FIG. 3 shows that the loop 115 of the first strap assembly 110 of the loop strap portion 114 may removably engage with the hook 300. The hook 300 may have a vehicle hook end 305 that is configured to removeably attach to a vehicle wheel, frame, protrusion, or door handle. The other end of the hook 300 may be a strap opening 306, which may have a slot 301, which allows the loop 115 to slide into the strap opening 306, such that the hook and the first strap assembly 110 are removeably engaged. The slot 301 also allows the strap loop 115 to be slid out of the strap opening 306, so that the strap assembly 110 and the hook 300 may be disengaged. The hook 300 is preferably configured to engage with any of the loops of the cover 100. The hook 300 may preferably be made from a strong material so as to withstand the elastic and wind forces and keep the cover 100 secured onto a vehicle. But, the hook 300 may also be made from a material that does not scratch the finish or wheels of the vehicle. Preferably, this material is a soft plastic, rubber, or coated metal.

Figure 4:
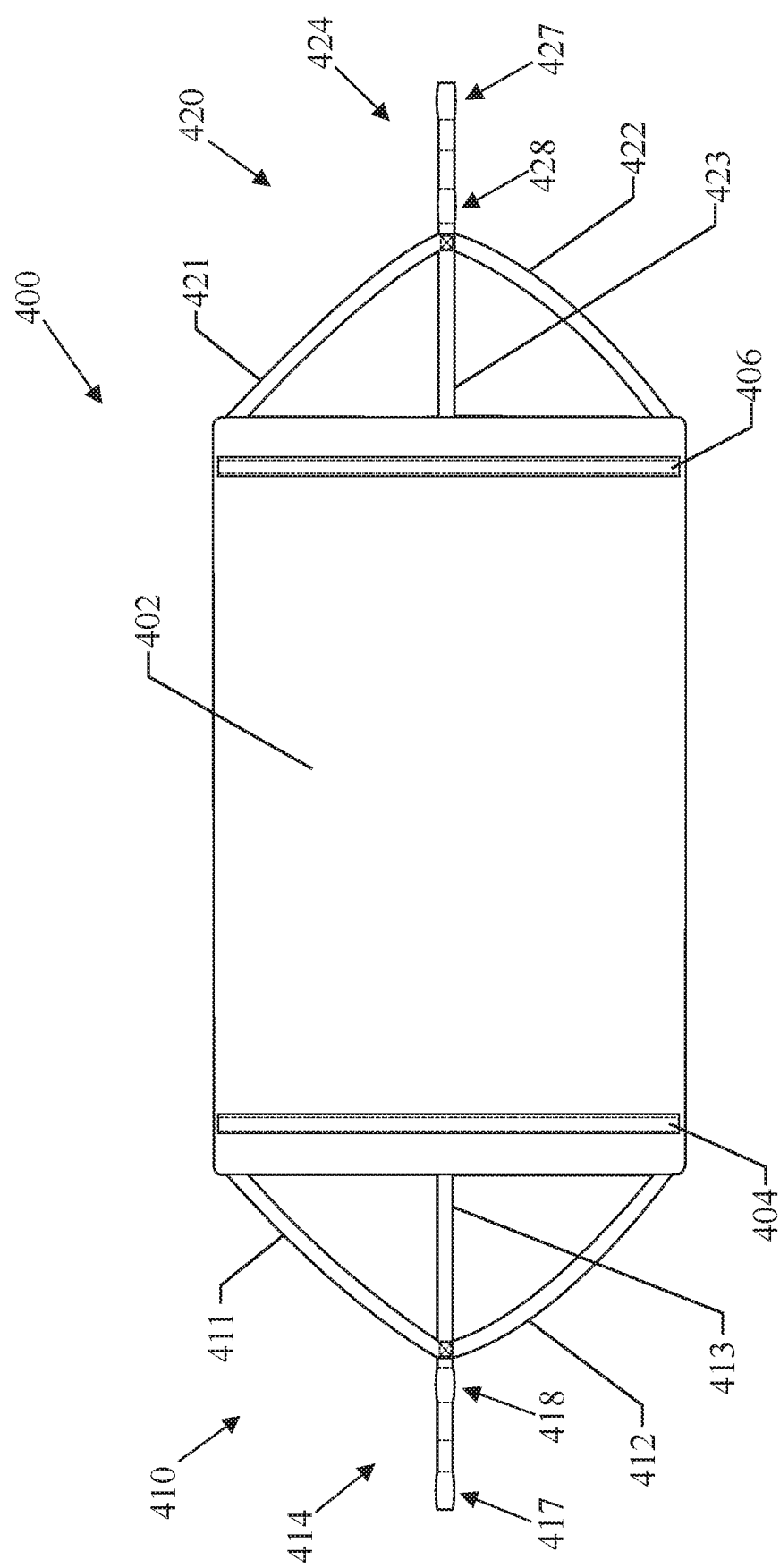
FIG. 4 is an illustration of a front view of another embodiment of the vehicle rear window cover.

FIG. 4 is an illustration of a front view of another embodiment of the vehicle rear window cover. FIG. 4 shows that a cover 400 may comprise a cover portion 402, first strap assembly 410, second strap assembly 420, and rigid supports 404, 406. The first strap assembly may comprise top strap 411, mid-strap 413, bottom strap 412, and strap loop portion 414, which may comprise loops 417 and 418. The second strap assembly 420 may comprise top strap 421, mid-strap 423, bottom strap 422, and strap loop portion 424, which comprises loops 427 and 428. FIG. 4 shows that the cover portion 402 may be substantially rectangular and be configured to fit most sedan type vehicles.

Figure 5:
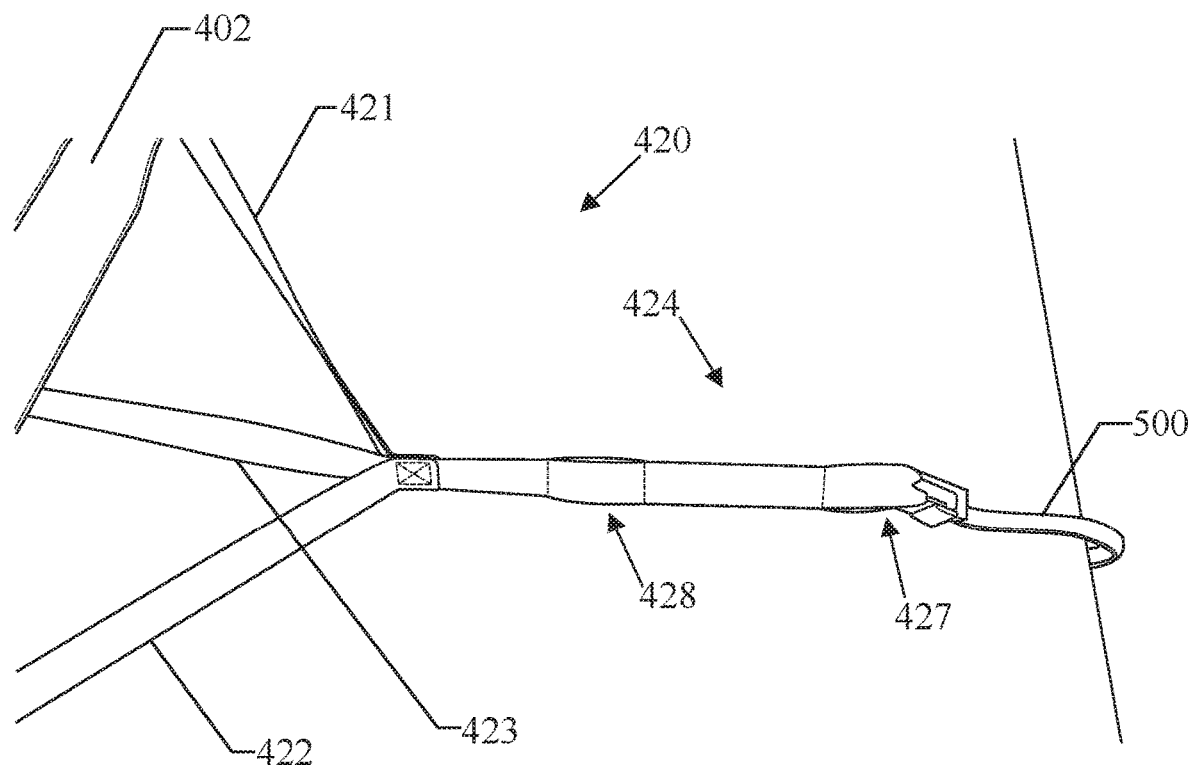
FIG. 5 is an illustration of a close-up front view of another embodiment of the vehicle rear window cover.

FIG. 5 is an illustration of a close-up front view of another embodiment of the vehicle rear window cover. FIG. 5 shows that the second strap assembly 420 may comprise top strap 421, mid-strap 423, bottom strap 422, and strap loop portion 424, which may comprise loops 427 and 428. FIG. 5 shows that the loop 417 is engaged with a hook 500.

Figure 6:
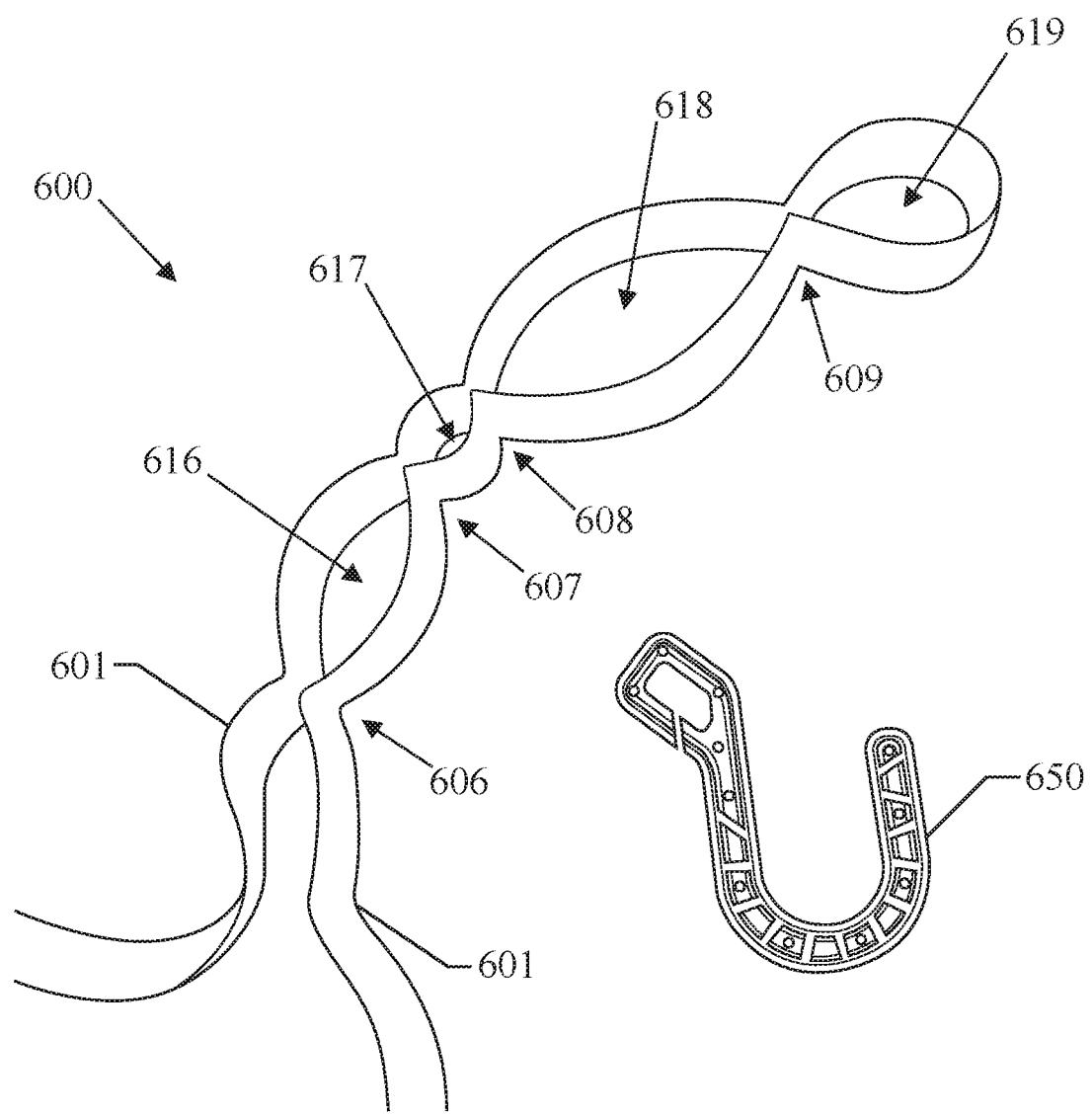
FIG. 6 is an illustration of a looped strap and a hook of one embodiment of the vehicle rear window cover.

FIG. 6 is an illustration of a looped strap and a hook of one embodiment of the vehicle rear window cover. FIG. 6 shows that a strap loop portion 600, in one embodiment, may be made from a single elastic strap 601 that is folded and attached to itself at attachment points 606, 607, 608, 609, which may form loops 616, 617, 618, 619. A removable hook 650 is shown not attached to any particular loop but is configured to attach to any of the loops 616, 617, 618, 619. In this manner, the rear window cover is adjustable on both sides of the cover portion, which may allow it to be secured to vehicles of many different sizes.

Figure 7:
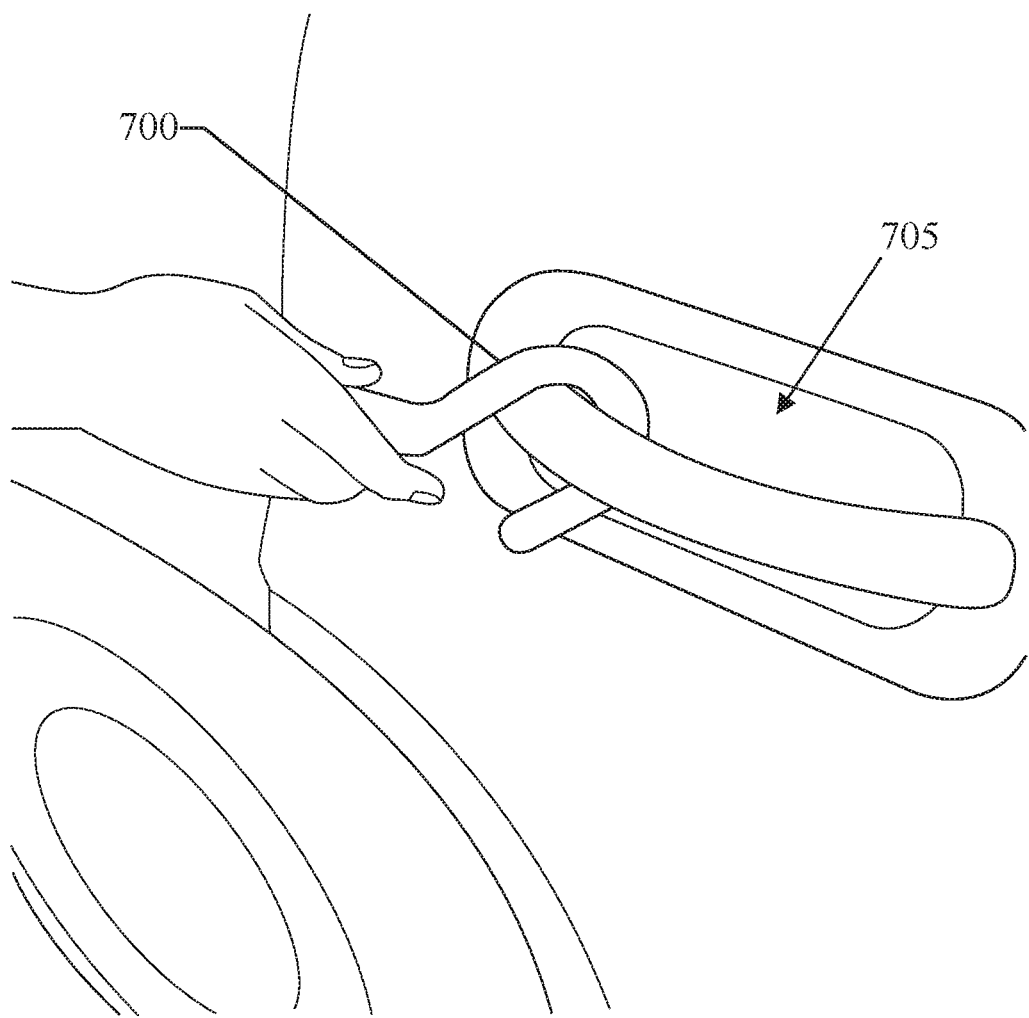
FIG. 7 is an illustration of one embodiment of the hook attached to a car door handle.

FIG. 7 is an illustration of one embodiment of the hook attached to a car door handle. FIG. 7 shows that a hook 700 may be secured, removeably, to the car door handle 705 of a vehicle. Preferably, the user may stretch the elastic strap that is engaged with the hook 700 such that the hook 700 is secured by tension to the handle 705. When the user wants to remove the cover from the vehicle, the user may stretch the strap, which may loosen the hook 700 and allows it to be disengaged from the handle 705.

Figure 8:
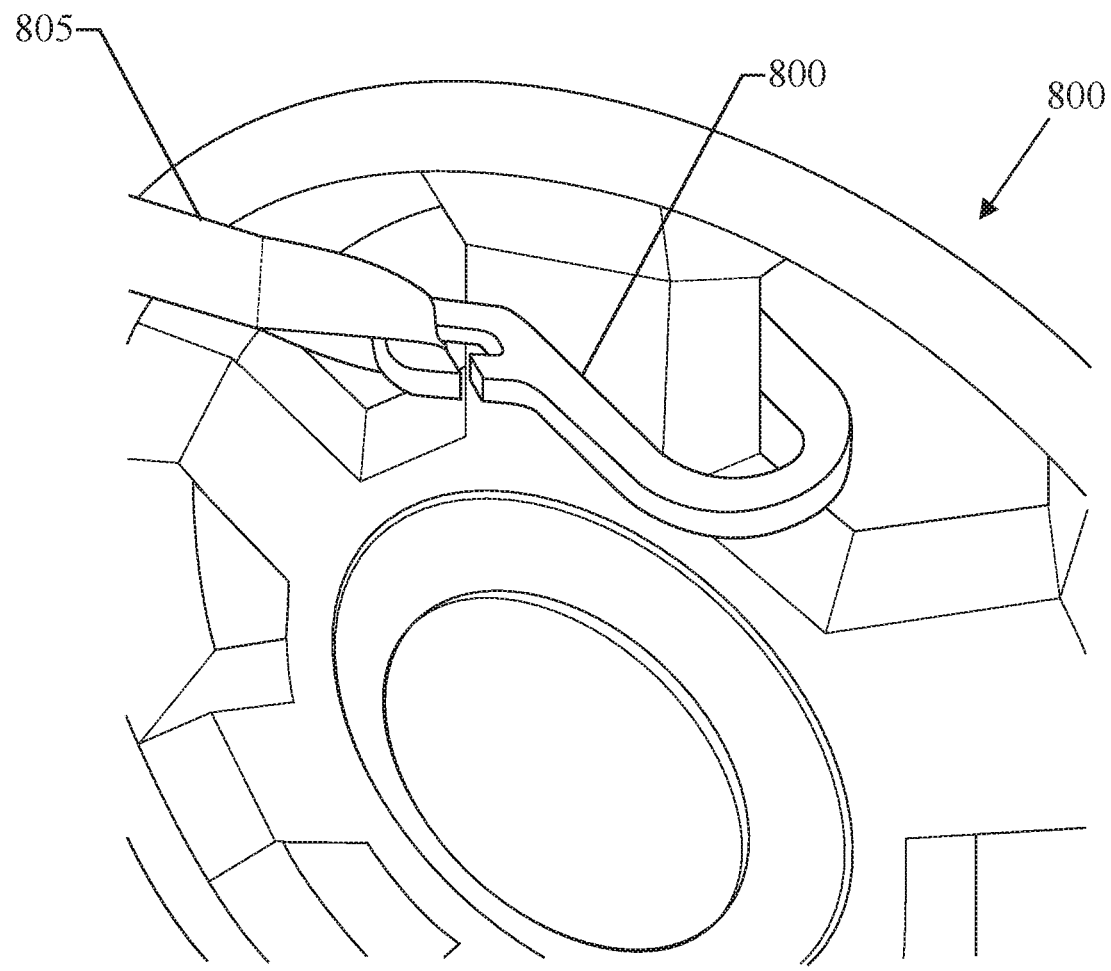
FIG. 8 is an illustration of one embodiment of the hook attached to a car wheel.

FIG. 8 is an illustration of one embodiment of the hook attached to a car wheel. FIG. 8 shows that a hook 800 may be secured, removeably, to a car wheel 810 of a vehicle. Preferably, the user may stretch an elastic strap 805 that is engaged with the hook 800 such that the hook 800 is secured by tension to the wheel 810, which in this case is the wheel rim. When the user wants to remove the cover from the vehicle, the user may stretch the strap 805, which may loosen the hook 800 and allows it to be disengaged from the wheel 810.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A vehicle rear window cover comprising:
    a cover portion;
    a first strap assembly, comprising: a first top strap, a first bottom strap, and a first strap loop portion;
    a second strap assembly, comprising: a second top strap, a second bottom strap, and a second strap loop portion;
    a first hook; and
    a second hook;
    wherein said first top strap, said first bottom strap and said first strap loop portion are connected at a first strap joint;
    wherein said second top strap, said second bottom strap and said second strap loop portion are connected at a second strap joint;
    wherein said cover portion, when engaged with a vehicle, substantially covers an outer surface of a rear windshield of said vehicle;
    wherein said cover portion comprises a top edge, a bottom edge, a first side edge, and a second side edge such that there is a first top corner, a second top corner, a first bottom corner, and a second bottom corner;
    wherein said first top strap extends between said first top corner and said first strap joint;
    wherein said first bottom strap extends between said first bottom corner and said first strap joint;
    wherein said second top strap extends between said second top corner and said second strap joint;
    wherein said second bottom strap extends between said second bottom corner and said second strap joint;
    wherein said first strap loop portion extends distally away from said first strap joint and comprises a plurality of first strap loops;
    wherein said second strap loop portion extends distally away from said second strap joint and comprises a plurality of second strap loops;
    wherein said first hook is configured to removeably engage with said plurality of first strap loops and wherein said second hook is configured to removeably engage with said plurality of second strap loops, such that said vehicle rear window cover is adjustable; and
    wherein said first hook and said second hook are configured to removeably engage with said vehicle, such that said cover portion is configured to be securely attached to said vehicle.

2. The vehicle rear window cover of claim 1, further comprising:
    two support members;
    wherein said two support members are located at said first side edge and at said second side edge and they substantially prevent said vehicle rear window cover from puckering when said vehicle rear window cover is on said vehicle.

3. The vehicle rear window cover of claim 1, wherein said first strap assembly further comprises a first mid-strap; and
    wherein said second strap assembly further comprises a second mid-strap.

4. The vehicle rear window cover of claim 3, wherein said first mid-strap extends from a first side of said cover portion to said first strap joint; and
    wherein said second mid-strap extends from a second side of said cover portion to said second strap joint.

5. The vehicle rear window cover of claim 1, wherein said cover portion also substantially covers one or more rear window wipers.

6. The vehicle rear window cover of claim 1, wherein said cover portion comprises an interior Polyvinyl Chloride coating;
    wherein said Polyvinyl Chloride coating makes said cover portion remain flexible in temperatures below 0° C.;
    wherein said cover portion substantially prevents frost, ice, and snow from adhering to a rear window.

7. The vehicle rear window cover of claim 1, wherein said top edge has a concave curve.

8. The vehicle rear window cover of claim 1, wherein each of said first and second hooks comprise a hook end and a strap opening, which comprises a slot that is configured to allow said first and second hooks to removeably engage with said plurality of first strap loops and said plurality of second strap loops.

9. The vehicle rear window cover of claim 1, wherein said first and second hooks are configured to removeably engage with a door handle of said vehicle.

10. The vehicle rear window cover of claim 1, wherein said first and second hooks are configured to removeably engage with a wheel of said vehicle.

11. A vehicle rear window cover comprising:
    a cover portion;
    a first strap assembly, comprising: a first top strap, a first bottom strap, and a first strap loop portion;
    a second strap assembly, comprising: a second top strap, a second bottom strap, and a second strap loop portion;
    a first hook;
    a second hook;
    two support members;
    wherein said first top strap, said first bottom strap and said first strap loop portion are connected at a first strap joint;
    wherein said second top strap, said second bottom strap and said second strap loop portion are connected at a second strap joint;
    wherein said cover portion, when engaged with a vehicle, substantially covers an outer surface of a rear windshield of said vehicle;
    wherein said cover portion comprises a top edge, a bottom edge, a first side edge, and a second side edge such that there is a first top corner, a second top corner, a first bottom corner, and a second bottom corner;
    wherein said first top strap extends between said first top corner and said first strap joint;
    wherein said first bottom strap extends between said first bottom corner and said first strap joint;
    wherein said second top strap extends between said second top corner and said second strap joint;
    wherein said second bottom strap extends between said second bottom corner and said second strap joint;
    wherein said first strap loop portion extends distally away from said first strap joint and comprises a plurality of first strap loops;
    wherein said second strap loop portion extends distally away from said second strap joint and comprises a plurality of strap loops;
    wherein said first hook comprises a strap opening and a slot that are configured to removeably engage with said plurality of first strap loops and wherein said second hook comprises a strap opening and a slot that are configured to removeably engage with said plurality of second strap loops, such that said vehicle rear window cover is adjustable; and
    wherein a hook end of said first hook and a hook end of said second hook are configured to removeably engage with said vehicle, such that said cover portion is configured to be securely attached to said vehicle.

12. The vehicle rear window cover of claim 11, wherein said two support members are located at said first side edge and at said second side edge and they substantially prevent said vehicle rear window cover from puckering when said vehicle rear window cover is on said vehicle.

13. The vehicle rear window cover of claim 11, wherein said first strap assembly further comprises a first mid-strap; and
wherein said second strap assembly further comprises a second mid-strap.

14. The vehicle rear window cover of claim 13, wherein said first mid-strap extends from a first side of said cover portion to said first strap joint; and
wherein said second mid-strap extends from a second side of said cover portion to said second strap joint.

15. The vehicle rear window cover of claim 11, wherein said cover portion also substantially covers one or more rear window wipers.

16. The vehicle rear window cover of claim 11, wherein said cover portion comprises an interior Polyvinyl Chloride coating;
wherein said Polyvinyl Chloride coating makes said cover portion remain flexible in temperatures below 0° C.;
wherein said cover portion substantially prevents frost, ice, and snow from adhering to said rear window.

17. The vehicle rear window cover of claim 11, wherein said top edge has a concave curve.

18. The vehicle rear window cover of claim 11, wherein said first and second hooks are configured to removeably engage with a door handle of said vehicle.

19. The vehicle rear window cover of claim 11, wherein said first and second hooks are configured to removeably engage with a wheel of said vehicle.

20. A vehicle rear window cover comprising:
a cover portion;
a first strap assembly, comprising: a first top strap, a first bottom strap, a first mid-strap, and a first strap loop portion;
a second strap assembly, comprising: a second top strap, a second bottom strap, a second mid-strap, and a second strap loop portion;
a first hook;
a second hook;
two support members;
wherein said first top strap, said first bottom strap and said first strap loop portion are connected at a first strap joint;
wherein said second top strap, said second bottom strap and said second strap loop portion are connected at a second strap joint;
wherein said cover portion, when engaged with a vehicle, substantially covers an outer surface of a rear windshield of said vehicle;
wherein said cover portion comprises a top edge, a bottom edge, a first side edge, and a second side edge such that there is a first top corner, a second top corner, a first bottom corner, and a second bottom corner;
wherein said first top strap extends between said first top corner and said first strap joint;
wherein said first bottom strap extends between said first bottom corner and said first strap joint;
wherein said second top strap extends between said second top corner and said second strap joint;
wherein said second bottom strap extends between said second bottom corner and said second strap joint;
wherein said first mid-strap extends from a first side of said cover portion to said first strap joint;
wherein said second mid-strap extends from a second side of said cover portion to said second strap joint;
wherein said first strap loop portion extends distally away from said first strap joint and comprises a plurality of first strap loops;
wherein said second strap loop portion extends distally away from said second strap joint and comprises a plurality of second strap loops;
wherein said first hook comprises a strap opening and a slot that are configured to removeably engage with said plurality of first strap loops and wherein said second hook comprises a strap opening and a slot that are configured to removeably engage with said plurality of second strap loops, such that said vehicle rear window cover is adjustable;
wherein a hook end of said first hook and a hook end of said second hook are configured to removeably engage with said vehicle, such that said cover portion is configured to be securely attached to said vehicle;
wherein said cover portion comprises an interior Polyvinyl Chloride coating;
wherein said Polyvinyl Chloride coating makes said cover portion remain flexible in temperatures below 0° C.;
wherein said cover portion substantially prevents frost, ice, and snow from adhering to said rear window; and
wherein said two support members are located at said first side edge and at said second side edge and they substantially prevent said vehicle rear window cover from puckering when said vehicle rear window cover is on said vehicle.

* * * * *